United States Patent
Zou (10) Patent No.: US 9,681,181 B2
(45) Date of Patent: Jun. 13, 2017

(54) METHOD AND DEVICE FOR WATCHING HIGH-DEFINITION CABLE TV PROGRAMS

(71) Applicants: Inventec Appliances (Pudong) Corporation, Shanghai (CN); Inventec Appliances Corp., New Taipei (TW); Inventec Appliances (JiangNing) Corporation, Nanjing (CN)

(72) Inventor: Zheng-Rong Zou, Nanjing (CN)

(73) Assignees: Inventec Appliances (Pudong) Corporation, Shanghai (CN); Inventec Appliances Corp., New Taipei (TW); Inventec Appliances (JiangNing) Corporation, Nanjing (CN)

(*) Notice: Subject to any disclaimer, the term of this patent is extended or adjusted under 35 U.S.C. 154(b) by 0 days.

(21) Appl. No.: 14/800,671

(22) Filed: Jul. 15, 2015

(65) Prior Publication Data

US 2016/0094873 A1     Mar. 31, 2016

(30) Foreign Application Priority Data

Sep. 30, 2014   (CN) .......................... 2014 1 0521535

(51) Int. Cl.
*H04N 21/4363*     (2011.01)
*H04N 21/41*       (2011.01)
(Continued)

(52) U.S. Cl.
CPC ... *H04N 21/43637* (2013.01); *H04N 21/4122* (2013.01); *H04N 21/4126* (2013.01);
(Continued)

(58) Field of Classification Search
CPC ......... H04N 21/43637; H04N 21/4122; H04N 21/4126; H04N 21/41407;
(Continued)

(56) References Cited

U.S. PATENT DOCUMENTS

| 2006/0209892 A1* | 9/2006 | MacMullan | H04N 5/775 370/468 |
| 2008/0299833 A1* | 12/2008 | Abe | H01R 13/642 439/660 |

(Continued)

FOREIGN PATENT DOCUMENTS

| CN | 202206509 U | 4/2012 |
| CN | 202856845 U | 4/2013 |

(Continued)

*Primary Examiner* — Benjamin R Bruckart
*Assistant Examiner* — Susan X Li
(74) *Attorney, Agent, or Firm* — CKC & Partners Co., Ltd.

(57) ABSTRACT

A method for watching high-definition cable TV programs includes: a blue-tooth learning remote controller learning remote-controller controlling instructions of a high-definition cable TV set top box, and uploading the learned instructions to a smart terminal such that the smart terminal controls the high-definition cable TV set top box; the smart terminal controlling the high-definition cable TV set top box to choose high-definition cable TV programs; the high-definition cable TV set top box outputting a HDMI signal; the smart TV dongle receiving the HDMI signal, and outputting the HDMI signal to a high-definition TV; the smart TV dongle performing an encoding and a packing on the HDMI signal and then transmitting the packed signal to the smart terminal by using a wireless manner; and the smart terminal performing a de-packing and a decoding on the received signal and then playing the decoded signal on the smart terminal.

13 Claims, 7 Drawing Sheets

(51) Int. Cl.
  *H04N 21/414*   (2011.01)
  *H04N 21/422*   (2011.01)
  *H04N 21/436*   (2011.01)
  *H04N 21/4402*  (2011.01)

(52) U.S. Cl.
  CPC ... *H04N 21/41407* (2013.01); *H04N 21/4222* (2013.01); *H04N 21/42219* (2013.01); *H04N 21/43615* (2013.01); *H04N 21/43635* (2013.01); *H04N 21/4402* (2013.01)

(58) Field of Classification Search
  CPC ..... H04N 21/440218; H04N 21/43615; H04N 21/43635; H04N 21/42226; H04N 21/42219
  See application file for complete search history.

(56) References Cited

U.S. PATENT DOCUMENTS

| | | | | |
|---|---|---|---|---|
| 2013/0107131 A1* | 5/2013 | Barnett | ............... | G08C 17/02 348/734 |
| 2014/0067828 A1* | 3/2014 | Archibong | ......... | H04L 65/4084 707/748 |
| 2014/0068466 A1 | 3/2014 | Garcia | | |

FOREIGN PATENT DOCUMENTS

| | | |
|---|---|---|
| CN | 103297824 A | 9/2013 |
| TW | M446461 U | 2/2013 |

* cited by examiner

A blue-tooth learning remote controller learning remote-controller controlling instructions of a high-definition cable TV set top box, and uploading the learned instructions to a smart terminal paired with the blue-tooth learning remote controller such that the smart terminal controls the high-definition cable TV set top box  —S31

The smart terminal controlling the high-definition cable TV set top box to choose high-definition cable TV programs, and setting a smart TV dongle to be in an external HDMI signal input mode; a HDMI signal output terminal of the high-definition cable TV set top box outputting a HDMI signal; a HDMI signal input terminal of the smart TV dongle receiving the HDMI signal, and then a HDMI signal output terminal of the smart TV dongle outputting the HDMI signal to a high-definition TV  —S32 the smart TV dongle performing an audio and video encoding and a playing format packing on the HDMI signal and then transmitting the packed data to the smart terminal by using a wireless manner; the smart terminal performing a playing format de-packing and an audio and video decoding on the received signal and then playing the decoded signal on the smart terminal  —S33

METHOD AND DEVICE FOR WATCHING HIGH-DEFINITION CABLE TV PROGRAMS

RELATED APPLICATIONS

This application claims priority to Chinese Application Serial Number 201410521535.3, filed Sep. 30, 2014, the entirety of which is herein incorporated by reference.

BACKGROUND

Technical Field

The present disclosure relates to communication techniques. More particularly, the present disclosure relates to a method and a device for watching high-definition cable TV programs.

Description of Related Art

Before the prosperous development of mobile communications and wideband network techniques, people are used to watch TV programs on high-definition televisions by utilizing high-definition cable TV set top boxes, satellite set top boxes, DVD players or blue ray DVD players. However, people can only watch TV programs at some fixed places in the house in this manner. Other family may be disturbed when the user watches night TV shows. Also, the user will miss some moments of the TV programs if he/she has to leave during the programs are played. As the development of smart phones and tablet computers, more and more people now benefits from the advantages of mobile offices and mobile entertainments. More and more smart application devices relating to the smart phones and tablet computers appear in the market. Therefore, the application demands of using a third screen at home arise fast.

Most smart HDMI TV dongles in the market only provide a HDMI output terminal, which only support the smart phone or the tablet computer to transmit programs to the TV dongles (in which the programs can be transmitted wirelessly). Since the TV dongles do not provide HDMI input terminal, the TV dongles are not able to support external high-definition cable TV set top boxes or high-definition video players. Therefore, it is not able to share high-definition cable TV programs or high-definition video programs wirelessly with the smart phone or the tablet computer.

SUMMARY

The present disclosure provides a method and a device for watching high-definition cable TV programs to solve a problem that the smart HDMI TV dongle only has a HDMI output terminal and thus isn't able to support external high-definition cable TV set top boxes or high-definition video players.

In one aspect, the present disclosure is related to a method for watching high-definition cable TV programs. The method includes: a Bluetooth learning remote controller learning remote-controller controlling instructions of a high-definition cable TV set top box, and uploading the learned instructions to a smart terminal paired with the Bluetooth learning remote controller such that the smart terminal controls the high-definition cable TV set top box; the smart terminal controlling the high-definition cable TV set top box to choose high-definition cable TV programs, and setting a smart TV dongle to be in an external HDMI signal input mode; a HDMI signal output terminal of the high-definition cable TV set top box outputting a HDMI signal; a HDMI signal input terminal of the smart TV dongle receiving the HDMI signal, and then a HDMI signal output terminal of the smart TV dongle outputting the HDMI signal to a high-definition TV; the smart TV dongle performing an audio and video encoding and a playing format packing on the HDMI signal and then transmitting the packed signal to the smart terminal by using a wireless manner, and the smart terminal performing a playing format de-packing and an audio and video decoding on the received signal and then playing the decoded signal on the smart terminal.

In another aspect, the present disclosure is related to a device for watching high-definition cable TV programs, including: a smart TV dongle and a Bluetooth learning remote controller. The smart TV dongle includes a HDMI input terminal and a HDMI output terminal, the HDMI input terminal is connected with a high-definition cable TV set top box, and the HDMI output terminal is connected with a high-definition TV; the Bluetooth learning remote controller is communicated with the high-definition cable TV set top box by utilizing infrared ray; and the smart TV dongle is communicated with a smart terminal wirelessly, and the Bluetooth learning remote controller is communicated with the smart terminal through a Bluetooth connection.

From the above, the present disclosure supports a smart TV dongle with dual HDMI input/output terminals. The smart TV dongle can perform a second encoding on the programs of the high-definition cable TV set top box, and transmit the encoded signal to the smart terminal for playing. Consequently, the user can watch the programs with the smart terminal anywhere in the house. Moreover, the smart terminal learns the controlling instructions of the controller of the high-definition TV through the Bluetooth learning remote controller. Consequently, the user can operate and control the high-definition TV through the smart terminal. Furthermore, the data on the smart phone can be transmitted to the high-definition TV for playing based on WiFi Direct, WiFi Display-Miracast, DLNA or Airplay protocols.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The present disclosure provides a method and a device for watching high-definition cable TV programs with a smart phone or a tablet computer. The method is based on WiFi wireless transmission and display technique, which provides an exquisite smart TV dongle with a HDMI input terminal. It is not needed to modify the inside functions and designs of the current high-definition cable TV set top box, satellite set top box, DVD player or blue ray DVD player. When the smart TV dongle is connected with the abovementioned devices, and the smart phone or the tablet computer is installed with corresponding controlling APPs, the programs of the high-definition cable TV set top box can be received wirelessly for playing. It is not needed to watch the programs with the TV, a user can watch the programs with the smart phone or the tablet computer when the cable TV set top box is turned on. Consequently, other people will not be disturbed especially during the nights. Moreover, the user can watch live TV programs with the smart phone or the tablet computer anywhere in the house without missing any moments (e.g., the user can still watch the live TV programs even in the toilet).

Figure 1:
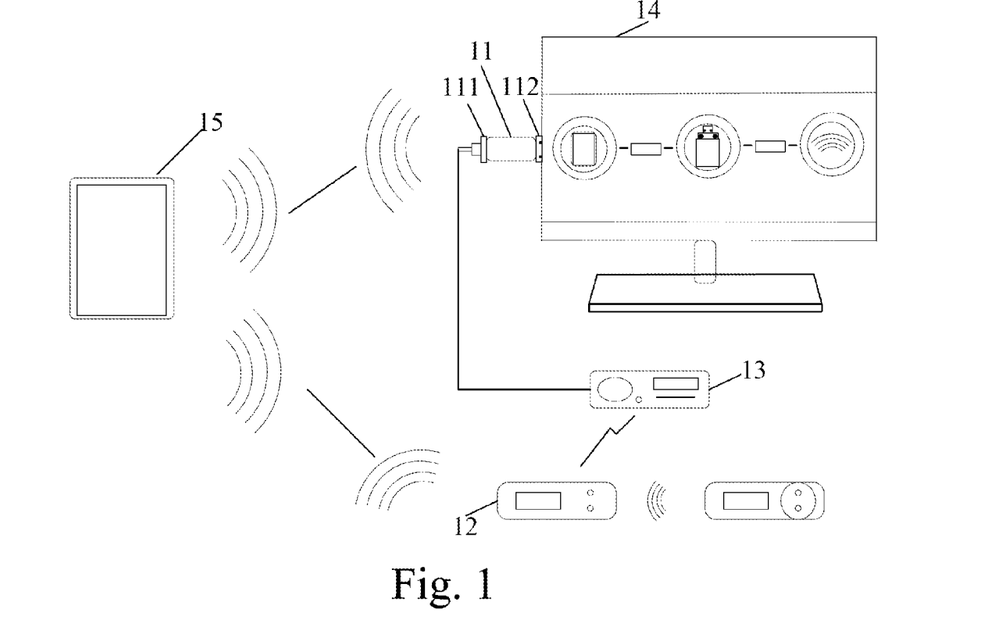
FIG. 1 is a schematic diagram of a device for watching high-definition cable TV programs in accordance with one embodiment of the present disclosure.

Reference is made first to FIG. 1. FIG. 1 is a schematic diagram of a device for watching high-definition cable TV programs in accordance with one embodiment of the present disclosure. The device includes a smart TV dongle 11 and a Bluetooth learning remote controller 12.

The smart TV dongle 11 includes a HDMI input terminal 111 and a HDMI output terminal 112. Both the HDMI input terminal 111 and the HDMI output terminal 112 are Type A female sockets. The HDMI input terminal 111 is connected with a high-definition cable TV set top box 13. The smart TV dongle 11 can be powered by the USB terminal of the high-definition cable TV set top box 13. The HDMI output terminal 112 is connected with a high-definition TV 14. The Bluetooth learning remote controller 12 is communicated with the high-definition cable TV set top box 13 by utilizing infrared ray. The smart TV dongle 11 is communicated with a smart terminal 15 wirelessly. The Bluetooth learning remote controller 12 is communicated with the smart terminal 15 through a Bluetooth connection.

Figure 2:
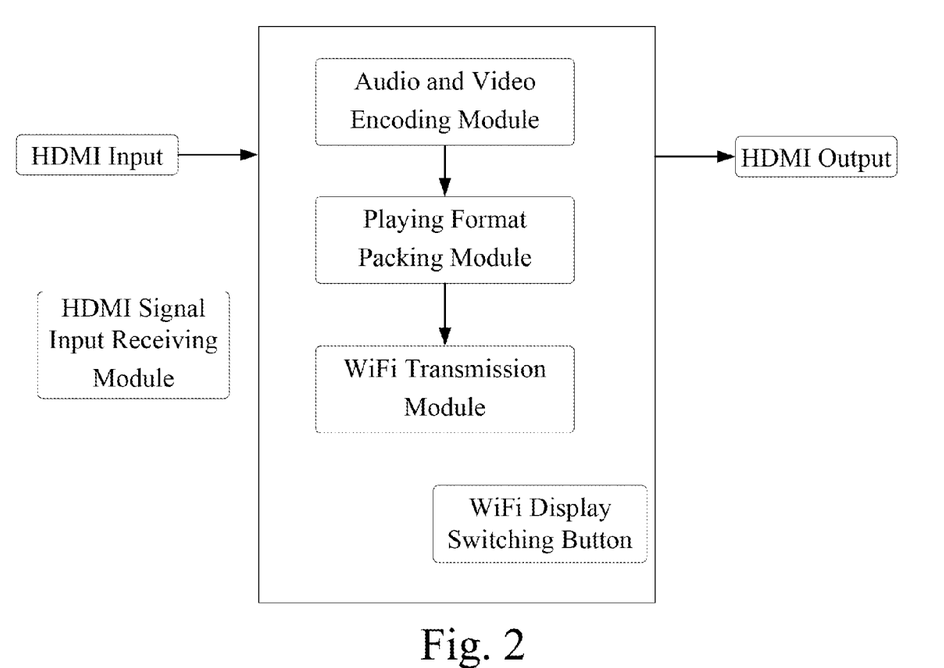
FIG. 2 is a schematic diagram of a smart TV dongle of the device for watching high-definition cable TV programs in accordance with one embodiment of the present disclosure.

Reference is made also to FIG. 2. FIG. 2 is a schematic diagram of a smart TV dongle in accordance with one embodiment of the present disclosure.

The smart TV dongle includes a HDMI signal input receiving module, an audio and video encoding module, a playing format packing module and a WiFi transmission module.

The HDMI signal input receiving module is configured to receive a HDMI signal outputted from a HDMI signal output terminal of the high-definition cable TV set top box.

The audio and video encoding module is configured to encode the HDMI signal for generating a basic code-stream data package, to perform a second program encoding on the basic code-stream data package, and then to output the basic code-stream data package.

The playing format packing module is electrically connected with the audio and video encoding module. The playing format packing module is configured to receive the basic code-stream data package, and to pack the basic code-stream data package as a general playing format data package.

The WiFi transmission module is electrically connected with the playing format packing module. The WiFi transmission module is configured to transmit the general playing format data package to the smart terminal by using a wireless manner.

Correspondingly, the smart terminal includes a WiFi receiving module, a playing format de-packing module, an audio and video decoding module and a main chip.

The WiFi receiving module is configured to receive the general playing format data package transmitted from the smart TV dongle.

The playing format de-packing module is electrically connected with the WiFi receiving module. The playing format de-packing module is configured to de-pack the general playing format data package.

The audio and video decoding module is electrically connected with the playing format de-packing module. The audio and video decoding module is configured to decode the de-packed general playing format data package.

The main chip includes the audio and video decoding module. The main chip is configured to play the decoded general playing format data package.

Figure 3:
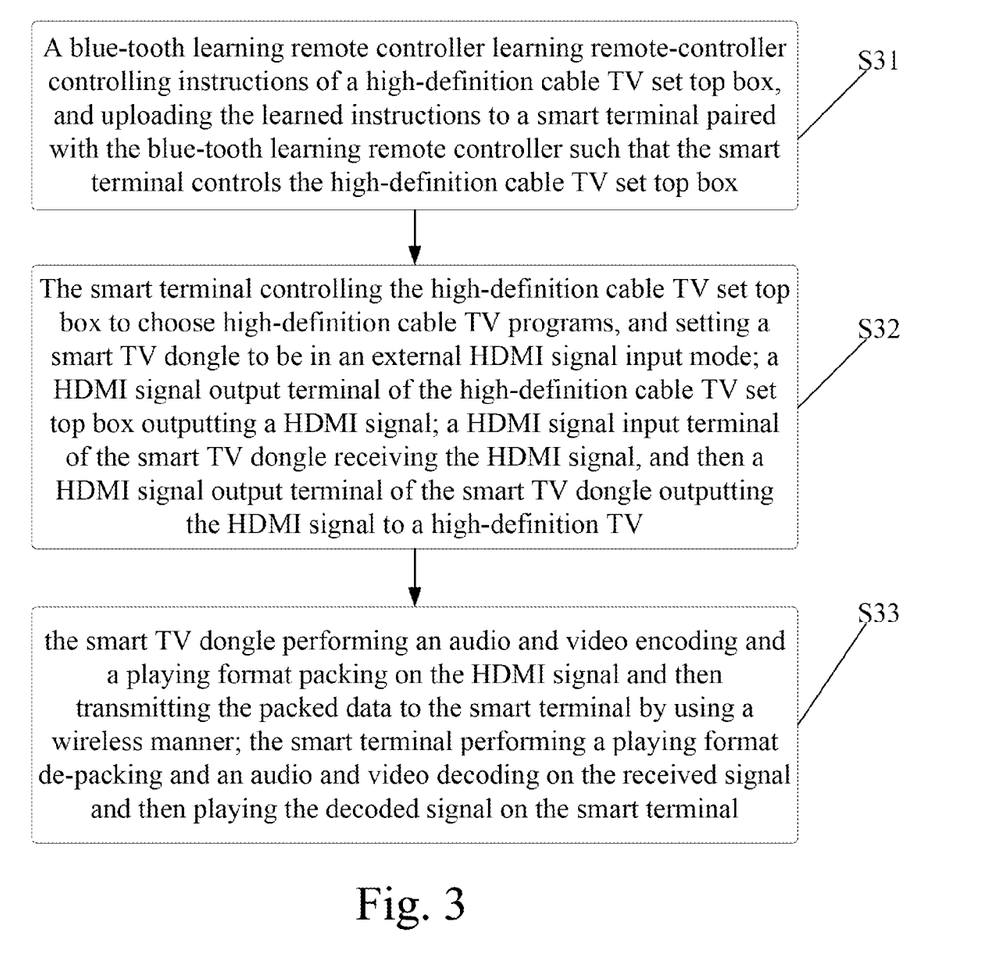
FIG. 3 is a flow chart of a method for watching high-definition cable TV programs in accordance with one embodiment of the present disclosure.

Additional reference is made to FIG. 3. FIG. 3 is a method for watching high-definition cable TV programs. The method includes the following steps.

In step S31, a Bluetooth learning remote controller learns remote-controller controlling instructions of a high-definition cable TV set top box, and uploads the learned instructions to a smart terminal paired with the Bluetooth learning remote controller such that the smart terminal controls the high-definition cable TV set top box.

Figure 4:
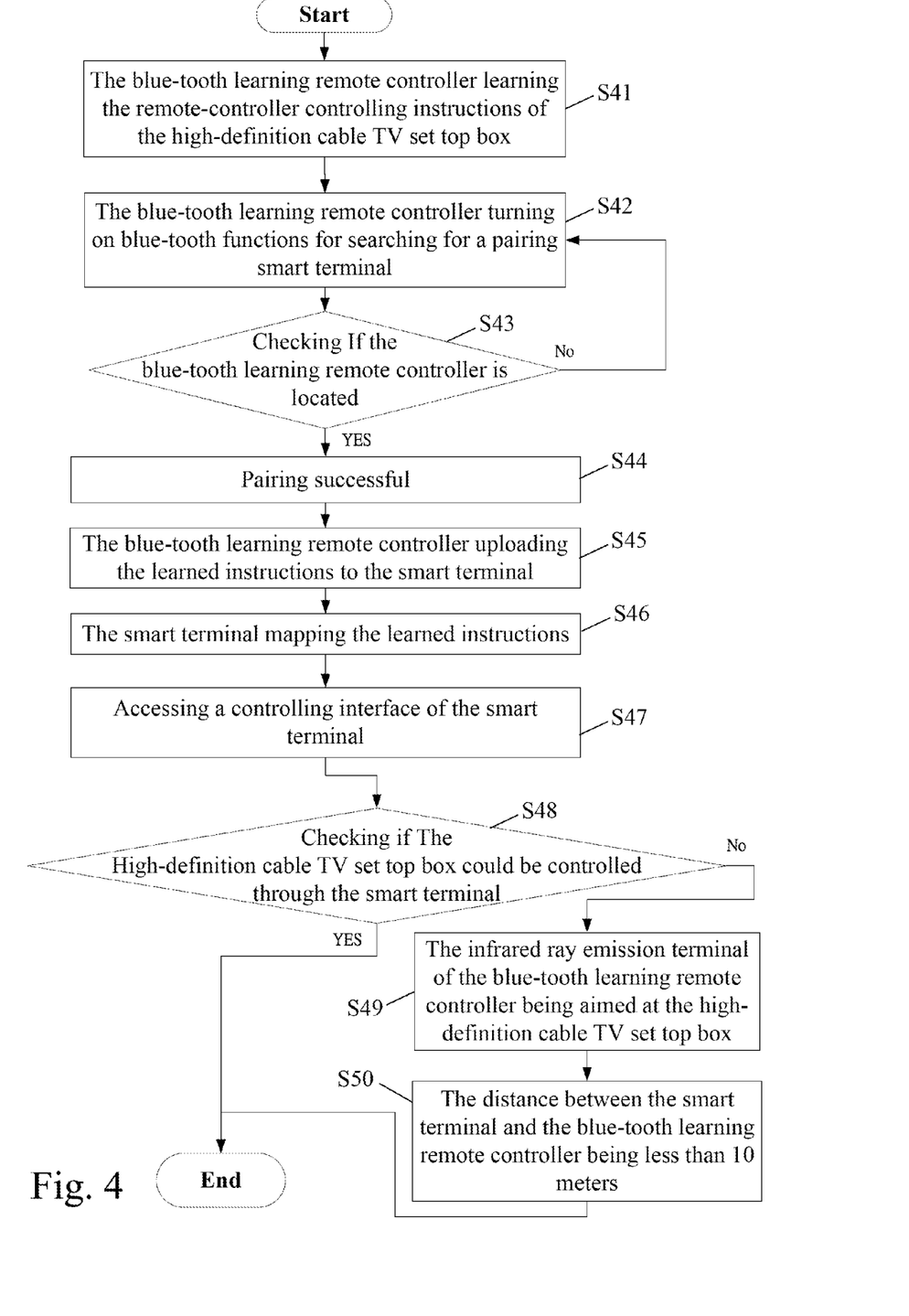
FIG. 4 is a flow chart of a smart terminal controlling a high-definition cable TV set top box in accordance with one embodiment of the present disclosure.

To be more precise, reference is also made to FIG. 4. First, the Bluetooth learning remote controller learns the remote-controller controlling instructions of the high-definition cable TV set top box (step S41). Second, both the Bluetooth learning remote controller and the smart terminal turns on Bluetooth functions for Bluetooth pairing (step S42). After a successful pairing (step S43-S44), the Bluetooth learning remote controller uploads the learned instructions to the paired smart terminal (step S45). Finally, the smart terminal maps the learned instructions (step S46), and accesses a controlling interface to control the high-definition cable TV set top box (step S47). The learned instructions can be generated by pressing the volume-adjusting buttons, the channel-adjusting buttons, the forwarding button, the reverse button or the pause button. Consequently, the smart terminal is able to control the high-definition cable TV set top box. If the smart terminal is not able to control the high-definition cable TV set top box (step S48), the user is suggested to check whether the infrared ray emission terminal of the Bluetooth learning remote controller is aimed at the high-definition cable TV set top box (step S49), and whether the distance between the smart terminal and the Bluetooth learning remote controller is less than a working distance, which is 10 meters in the present embodiment (step S50).

In step S32, the smart terminal controls the high-definition cable TV set top box to choose high-definition cable TV programs, and sets the smart TV dongle to be in an external HDMI signal input mode. A HDMI signal output terminal of the high-definition cable TV set top box outputs a HDMI signal. A HDMI signal input terminal of the smart TV dongle receives the HDMI signal, and then a HDMI signal output terminal of the smart TV dongle outputs the HDMI signal to a high-definition TV.

In step S33, the smart TV dongle performs an audio and video encoding and a playing format packing on the HDMI signal for transmitting the packed signal to the smart terminal by using a wireless manner. The smart terminal performs a playing format de-packing and an audio and video decoding on the received signal for playing the decoded signal on the smart terminal.

In that embodiment, when the smart TV dongle is set to be in an external HDMI signal input mode, the chosen high-definition cable TV programs can be encoded with 1080P 30 fps H.264 video encoding and LPCM or AAC audio encoding by a multiple media processor, be converted to a TS stream, and then be outputted via a peer-to-peer WiFi direct connection channel. The smart terminal activates a peer-to-peer WiFi direct connection by utilizing wireless display function. After the second encoding, the programs outputted from the high-definition cable TV set top box can be transmitted to the smart terminal to decode and play such that the smart terminal can adjust the playing volume and play the programs reversely via the control channel.

Figure 5:
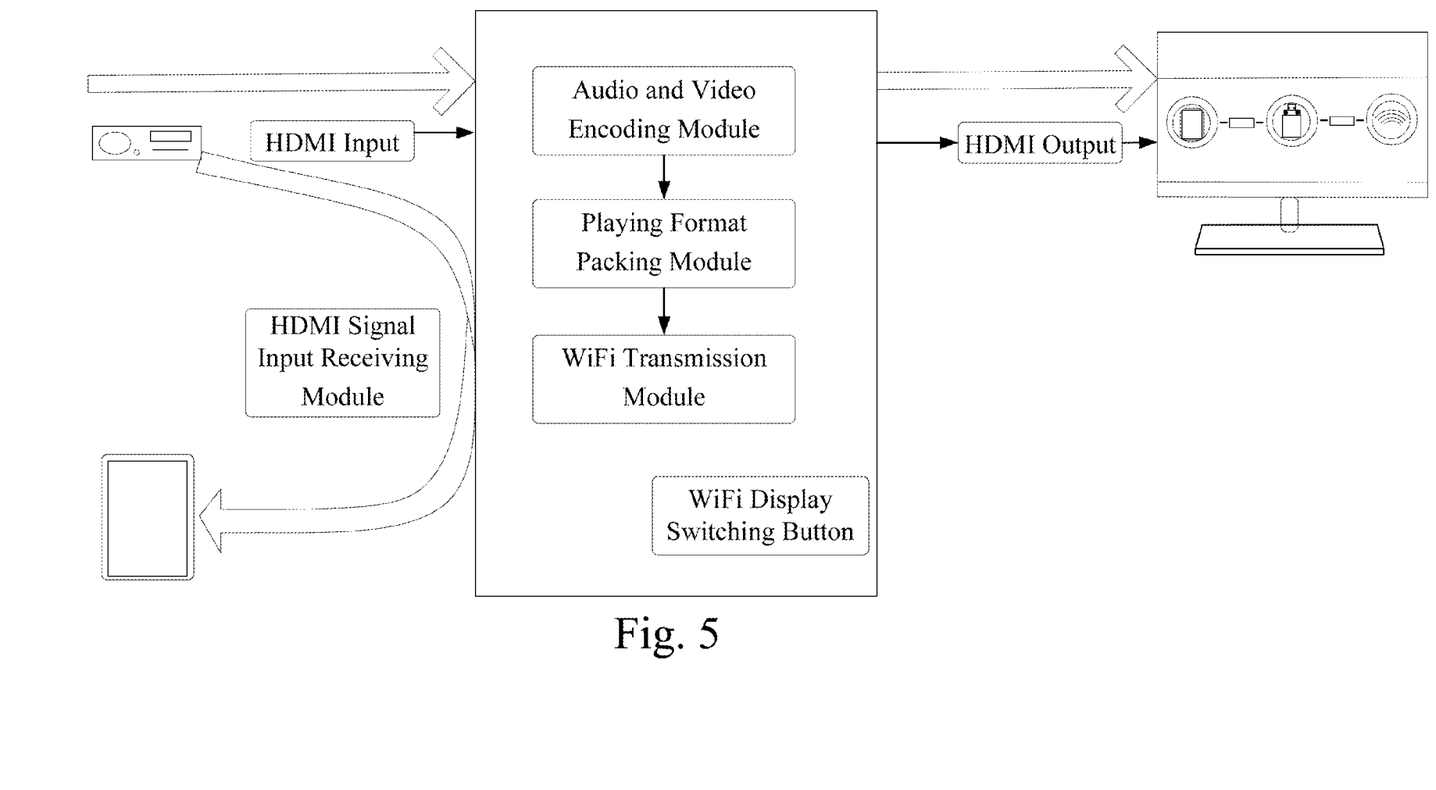
FIG. 5 is a schematic diagram of a signal transmission path of a smart TV dongle under an external HDMI signal input mode for watching high-definition cable TV programs on a smart terminal in accordance with one embodiment of the present disclosure.

To be more precise, reference is now made to FIG. 5. When the working mode is set to be in the external HDMI signal input mode, the smart terminal can turn on or turn off the high-definition TV, and serve as a mobile phone remote controller. The user can control the TV to perform functions such as fast-forwarding, fast-reversing, channel adjusting and volume-adjusting by simply sliding fingers on the smart terminal. The smart terminal also supports WiFi wireless display mode. At this time, the smart TV dongle serves as a WiFi Display transmitter. First, the smart TV dongle receives the HDMI signal outputted from the HDMI signal output terminal of the high-definition cable TV set top box. Then the smart TV dongle encodes the HDMI signal to generate a basic code-stream data package, performs the second program encoding on the basic code-stream data package, and then outputs the basic code-stream data package. The smart TV dongle receives the basic code-stream data package, packs the basic code-stream data package as a general playing format data package. Finally, the smart TV dongle transmits the general playing format data package to the smart terminal by using the wireless manner. On the other hand, the smart terminal serves as a receiver. First, the smart terminal receives the general playing format data package transmitted from the smart TV dongle. Then the smart terminal de-packs the general playing format data package, and decodes the de-packed general playing format data package. Finally, the smart terminal plays the decoded general playing format data package. Consequently, the high-definition cable TV programs are shared on the smart terminal with almost no delay occurred.

Moreover, according to another embodiment of the present disclosure, besides setting the smart TV dongle to be in the external HDMI signal input mode, the smart TV dongle can also be set to be in a local WiFi TV dongle working mode. Thereby, the smart terminal can transmit data for playing on the high-definition TV through the smart TV dongle.

Figure 6:
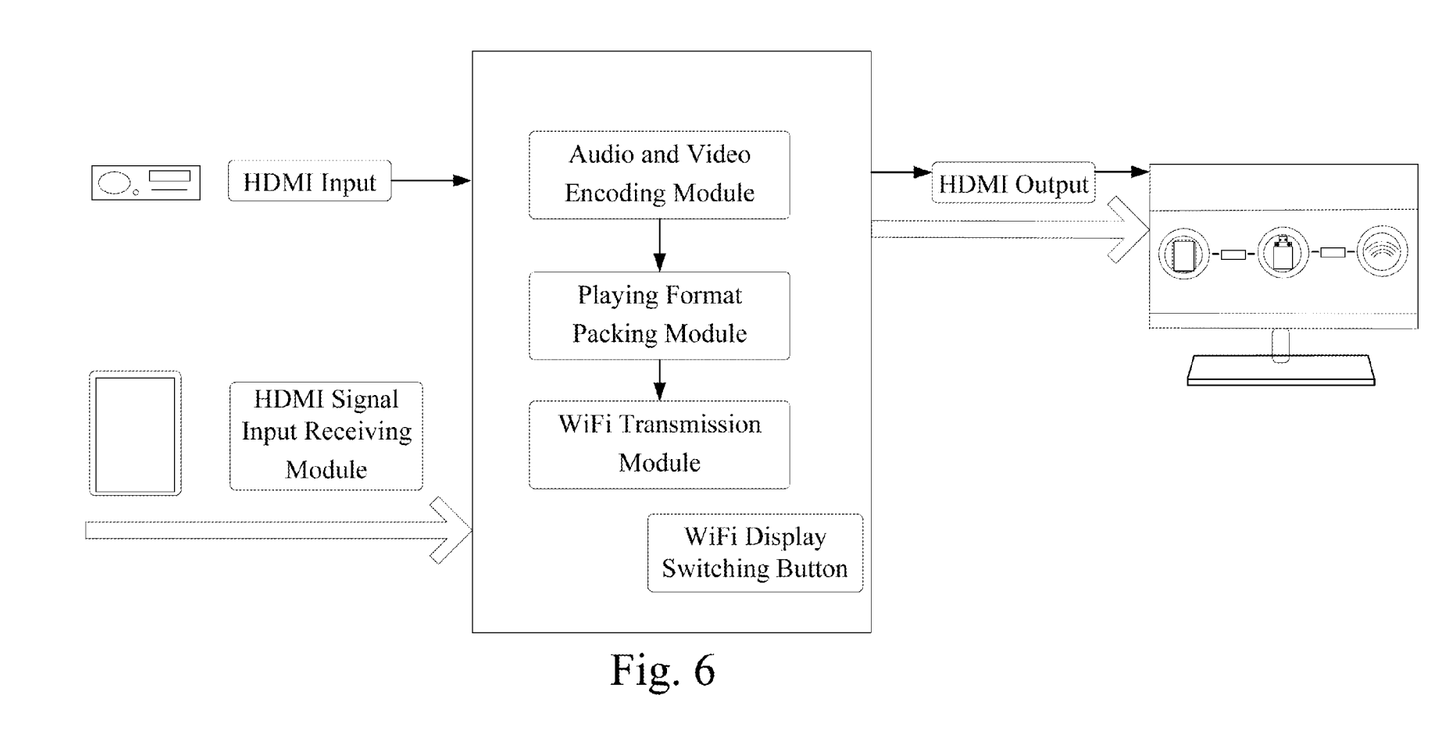
FIGS. 6-8 are schematic diagrams of signal transmission paths of smart TV dongles under local WiFi TV dongle working modes for watching high-definition cable TV programs on smart terminals in accordance with one embodiment of the present disclosure.

Reference is further made to FIG. 6. In this embodiment, the smart TV dongle is already set to be in the external HDMI signal input mode. At this moment, the smart terminal controls the smart TV dongle to work in an AP mode, i.e., the smart TV dongle can serves as a hot spot to be connected with other mobile devices. The smart terminal can be connected with the smart TV dongle by simply taking a photo of the two-dimensional code outputted from the smart TV dongle, where it is not needed to input an IP address of the AP. After the connection is established, the smart terminal can transmit DLNA local media contents (e.g., video, photos or/and music) which support the smart terminal to the high-definition TV for playing the video, photos or/and music on the large screen of the high-definition TV and sharing them with other family members. It has to be explained that the DLNA is utilized to transmit files. When a file is transmitted to the TV dongle through WiFi, the TV dongle decodes the file and outputs the decoded file to the high-definition TV through the HDMI. Since the DLNA is utilized to transmit multimedia files, operations like games, web browsing, etc., can not be transmitted as files.

Figure 7:
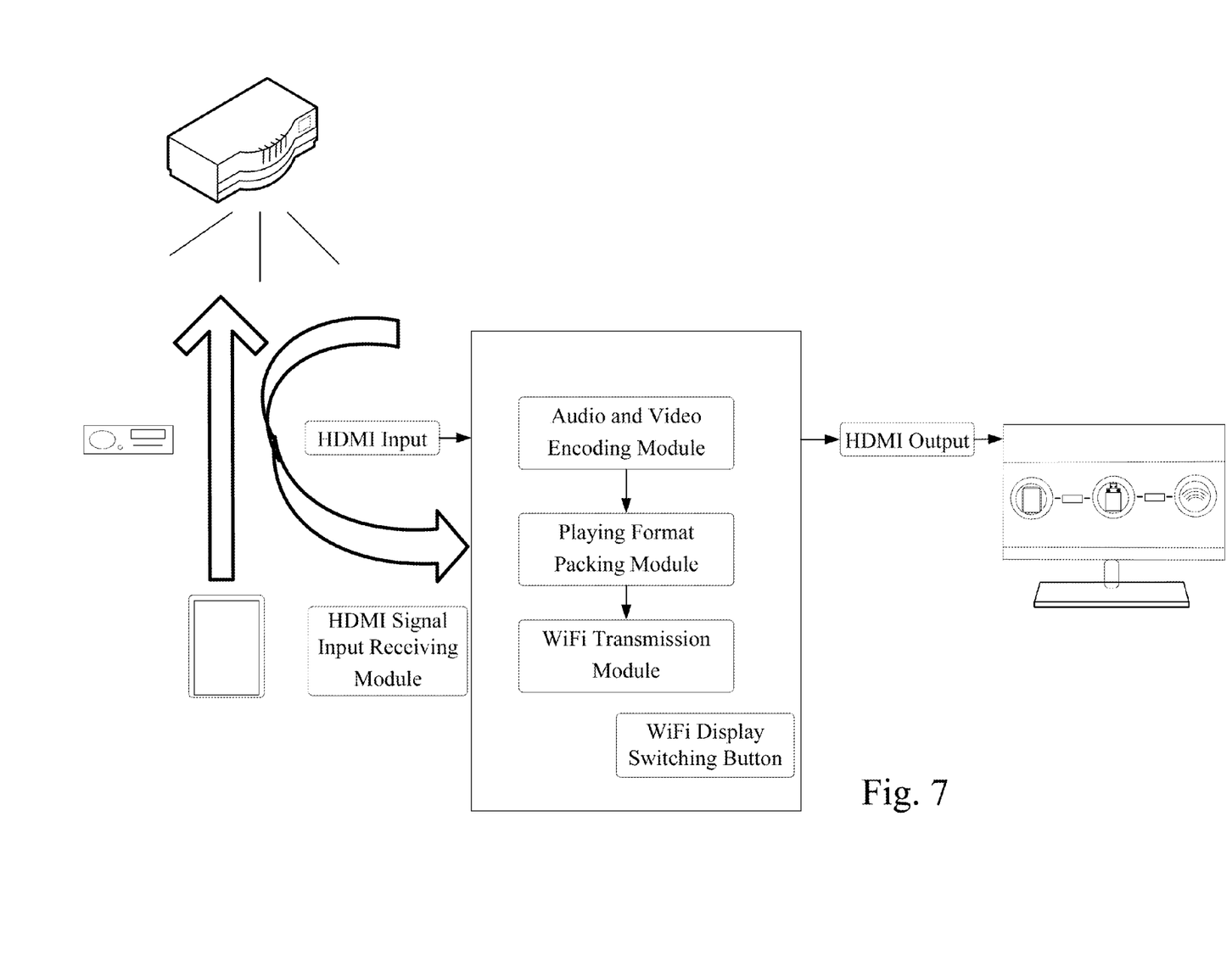

Reference is now made to FIG. 7. In this embodiment, the smart TV dongle is already set to be in the external HDMI signal input mode. To transmit network media stream to the smart TV dongle for playing, it is needed to provide an AP router which can provide internet connection in the environment where the smart TV dongle is working. Consequently, the smart terminal and the smart TV dongle can be connected with the same AP in the local network. Therefore, the smart terminal and the smart TV dongle can both connect with the Internet. The smart terminal selects an online internet video and transmits it to the high-definition TV for playing through the smart TV dongle. At this time, the smart terminal can be equipped with a touch panel. The user can control the TV to perform functions such as fast-forwarding, fast-reversing, channel adjusting and volume-adjusting by simply sliding fingers on the smart terminal.

Figure 8:
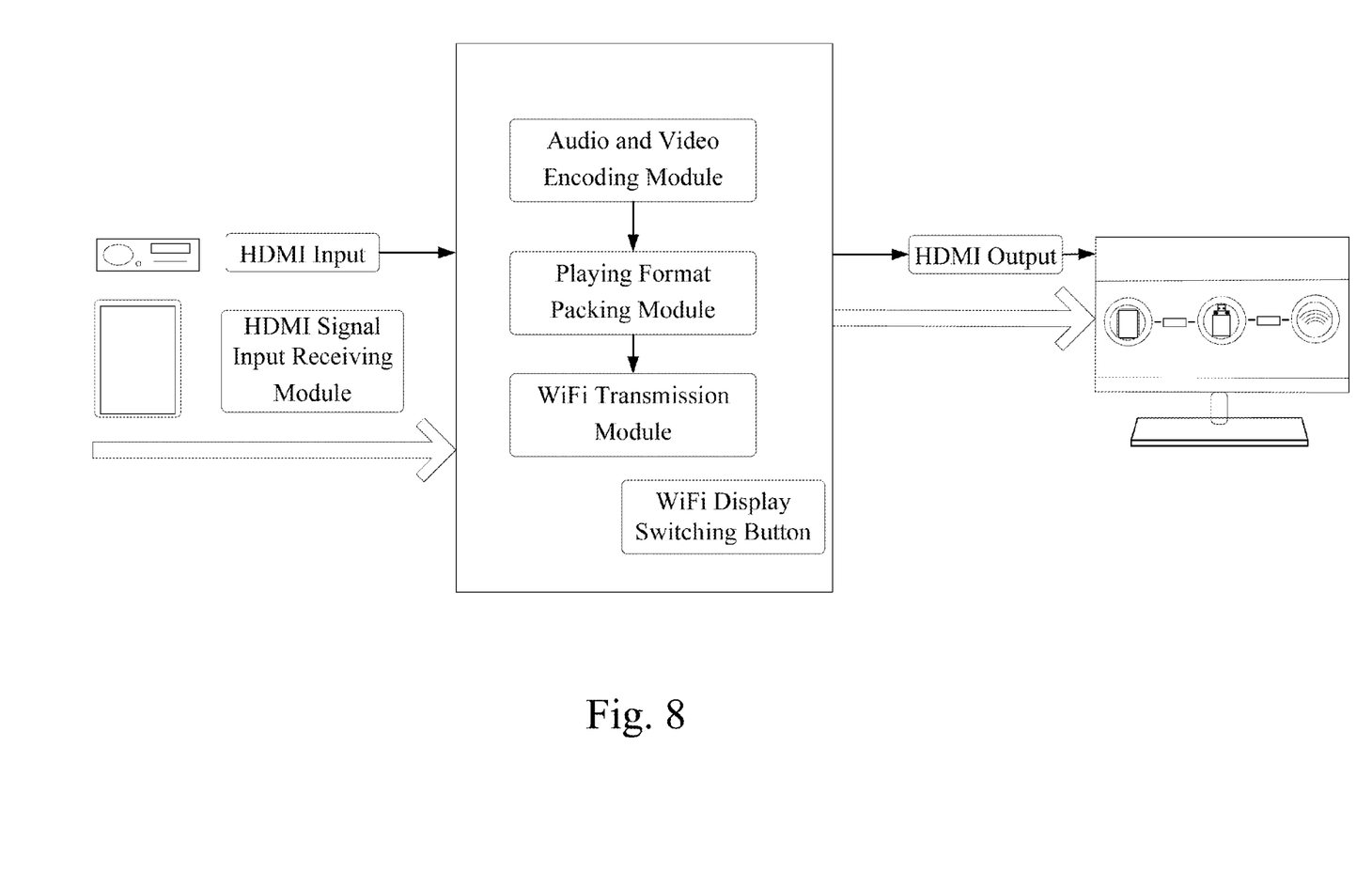

Reference is further made to FIG. 8. In this embodiment, the smart TV dongle is already set to be in the external HDMI signal input mode. It can switch the smart TV dongle to be in a WiFi Display working mode by pressing the WiFi Display switching button on the smart TV dongle or use the smart TV dongle applications in the smart phone to enter the setting menu and select the wireless display function, the smart terminal can wirelessly connect with the smart TV dongle on a peer to peer connection, in which no external router is needed to bridge the network. At this time, the smart terminal serves as the transmitter to perform a H.264/AAC encoding at 1080P, 30 fps and the smart TV dongle serves as a receiver to perform a hardware decoding at 1080P, 30 fps for supporting contents including multimedia, documents, web-pages or games to be transmitted to the large screen for playing with almost no delay. During the video is transmitted wirelessly, touch operations like fast-forwarding, fast-reversing, channel adjusting and volume-adjusting can be performed in the smart terminal.

From the above, the present disclosure supports a smart TV dongle with dual HDMI input/output terminals. The smart TV dongle can perform the second encoding on the programs of the high-definition cable TV set top box, and transmit it to the smart terminal for playing. Consequently, the user can watch the programs with the smart terminal anywhere in the house. Moreover, the smart terminal learns the controlling instructions of the controller of the high-definition TV through the Bluetooth learning remote controller. Consequently, the user can operate and control the high-definition TV through the smart terminal. Furthermore, the data on the smart phone can be transmitted to the high-definition TV for playing based on WiFi Direct, WiFi Display-Miracast, DLNA or Airplay protocols.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for watching high-definition cable TV programs, comprising:
    a Bluetooth learning remote controller learning remote-controller controlling instructions of a high-definition cable TV set top box, and uploading the learned instructions to a smart terminal paired with the Bluetooth learning remote controller such that the smart terminal controls the high-definition cable TV set top box;
    the smart terminal controlling the high-definition cable TV set top box to choose high-definition cable TV programs, and setting a smart TV dongle to be in an external HDMI signal input mode; a HDMI signal output terminal of the high-definition cable TV set top box outputting a HDMI signal; a HDMI signal input terminal of the smart TV dongle receiving the HDMI signal, and then a HDMI signal output terminal of the smart TV dongle outputting the HDMI signal to a high-definition TV;
    the smart TV dongle performing an audio and video encoding and a playing format packing on the HDMI signal and then transmitting the packed signal to the smart terminal by using a wireless manner; the smart terminal performing a playing format de-packing and an audio and video decoding on the received signal and then playing the decoded signal on the smart terminal.

2. The method of claim 1, wherein the Bluetooth learning remote controller learning the remote-controller controlling instructions of the high-definition cable TV set top box, and uploading the learned instructions to the smart terminal paired with the Bluetooth learning remote controller such that the smart terminal controls the high-definition cable TV set top box further comprises:
    the Bluetooth learning remote controller learning the remote-controller controlling instructions of the high-definition cable TV set top box;
    the Bluetooth learning remote controller tuning on Bluetooth functions for searching for a pairing smart terminal; uploading the learned instructions to the smart terminal paired with the Bluetooth learning remote controller after a successful pairing; and
    the smart terminal mapping the learned instructions, and accessing a controlling interface to control the high-definition cable TV set top box.

3. The method of claim 1, wherein the smart TV dongle performing the audio and video encoding and the playing format packing on the HDMI signal and then transmitting the packed signal to the smart terminal by using the wireless manner; the smart terminal performing the playing format de-packing and the audio and video decoding on the received signal and then playing the decoded signal on the smart terminal further comprises:
    receiving the HDMI signal outputted from the HDMI signal output terminal of the high-definition cable TV set top box;
    encoding the HDMI signal to generate a basic code-stream data package, performing a second program encoding on the basic code-stream data package, and then outputting the basic code-stream data package;
    receiving the basic code-stream data package, packing the basic code-stream data package as a general playing format data package;
    transmitting the general playing format data package to the smart terminal by using the wireless manner;
    the smart terminal receiving the general playing format data package transmitted from the smart TV dongle;
    de-packing the general playing format data package;
    decoding the de-packed general playing format data package; and
    playing the decoded general playing format data package.

4. The method of claim 1 further comprising:
    setting the smart TV dongle to be in a local WiFi TV dongle working mode;
    the smart terminal scanning a two-dimensional code of the smart TV dongle such that the smart TV dongle serves as a hot spot to be connected with the smart terminal;
    the smart terminal transmitting local media contents to the high-definition TV for playing the local media contents on the high-definition TV through the smart TV dongle.

5. The method of claim 4, wherein the local media contents are multimedia files.

6. The method of claim 1 further comprising:
    setting the smart TV dongle to be in a local WiFi TV dongle working mode;
    the smart terminal and the smart TV dongle searching for an external router and connecting with the external router; and
    the smart terminal choosing a video source online and transmitting the video source to the high-definition TV for playing the video source on the high-definition TV through the smart TV dongle.

7. The method of claim 6, wherein the external router is an AP router.

8. The method of claim 1 further comprising:
    setting the smart TV dongle to be in a local WiFi TV dongle working mode, and further to be in a WiFi Display working mode; the smart terminal turning on a wireless connection, and wirelessly connecting with the smart TV dongle on a peer to peer connection;
    the smart terminal transmitting local media contents, local files, local web-pages or local games to the high-definition TV for playing the local media contents, the local files, the local web-pages or the local games on the high-definition TV through the smart TV dongle.

9. The method of claim 1, wherein the wireless manner is peer-to-peer WiFi direct connection.

10. A device for watching high-definition cable TV programs, comprising: a smart TV dongle and a Bluetooth learning remote controller; wherein
    the smart TV dongle comprises a HDMI input terminal, a HDMI output terminal and an audio and video encoding circuit, the HDMI input terminal is connected with a high-definition cable TV set top box, the HDMI output terminal is connected with a high-definition TV, and the audio and video encoding circuit is configured to encode a HDMI signal for generating a basic code-stream data package, to perform a second program encoding on the basic code-stream data package, and then to output the basic code-stream data package;
    the Bluetooth learning remote controller is communicated with the high-definition cable TV set top box by utilizing infrared ray, and uploads learned instructions to a smart terminal paired with the Bluetooth learning remote controller such that the smart terminal controls the high-definition cable TV set too box; and the smart TV dongle is communicated with the smart terminal wirelessly, and the Bluetooth learning remote controller is communicated with the smart terminal through a Bluetooth connection.

11. The device of claim 10, wherein the HDMI input terminal and the HDMI output terminal are both Type A female sockets.

12. The device of claim 10, wherein the smart TV dongle further comprises:
- a HDMI signal input receiving circuit, configured to receive the HDMI signal outputted from a HDMI signal output terminal of the high-definition cable TV set top box;
- a playing format packing circuit, electrically connected with the audio and video encoding circuit, and configured to receive the basic code-stream data package and to pack the basic code-stream data package as a general playing format data package; and
- a WiFi transmission circuit, electrically connected with the playing format packing circuit, and configured to transmit the general playing format data package to the smart terminal by using a wireless manner.

13. The device of claim 12, wherein the smart terminal further comprises:
- a WiFi receiving circuit, configured to receive the general playing format data package transmitted from the smart TV dongle;
- a playing format de-packing circuit, electrically connected with the WiFi receiving circuit, and configured to de-pack the general playing format data package;
- an audio and video decoding circuit, electrically connected with the playing format de-packing circuit, and configured to decode the de-packed general playing format data package; and
- a main chip comprising the audio and video decoding circuit, the main chip being configured to play the decoded general playing format data package.

* * * * *